(12) United States Patent
Duch et al.

(10) Patent No.: US 12,247,623 B2
(45) Date of Patent: Mar. 11, 2025

(54) LOW FRICTION SEALING DEVICE AND ASSOCIATED ROLLING BEARING

(71) Applicant: AKTIEBOLAGET SKF, Gothenburg (SE)

(72) Inventors: Daniele Duch, San Gillio (IT); Piero Genualdo, Turin (IT)

(73) Assignee: AKTIEBOLAGET SKF, Gothenburg (SE)

( * ) Notice: Subject to any disclaimer, the term of this patent is extended or adjusted under 35 U.S.C. 154(b) by 80 days.

(21) Appl. No.: 18/360,242

(22) Filed: Jul. 27, 2023

(65) Prior Publication Data
US 2024/0052888 A1    Feb. 15, 2024

(30) Foreign Application Priority Data

Aug. 10, 2022  (IT) .......................... 102022000017076

(51) Int. Cl.
*F16C 33/78* (2006.01)
*F16C 19/06* (2006.01)
*F16C 33/80* (2006.01)

(52) U.S. Cl.
CPC .......... *F16C 33/7823* (2013.01); *F16C 19/06* (2013.01); *F16C 33/7883* (2013.01); *F16C 33/80* (2013.01); *F16C 2326/02* (2013.01); *F16C 2326/10* (2013.01)

(58) Field of Classification Search
CPC .. F16C 19/06; F16C 33/7823; F16C 33/7826; F16C 33/7883; F16C 33/80
See application file for complete search history.

(56) References Cited

U.S. PATENT DOCUMENTS

2020/0141448 A1\* 5/2020 Kim .................... F16C 33/7823
2021/0254668 A1\* 8/2021 Suzuki ................ F16C 33/7863

FOREIGN PATENT DOCUMENTS

| DE | 112019003837 | | 4/2021 | |
|---|---|---|---|---|
| EP | 3587867 A1 | \* | 1/2020 | ............ F16C 19/184 |
| JP | 2007285499 A | \* | 11/2007 | .......... F16C 33/7883 |

(Continued)

OTHER PUBLICATIONS

Search Report and Written Opinion from the Italian Patent Office dispatched Mar. 8, 2023 in related application No. 102022000017076.

*Primary Examiner* — Phillip A Johnson
(74) *Attorney, Agent, or Firm* — J-TEK LAW PLLC; Scott T. Wakeman; Mark A. Ussai (57) ABSTRACT

A rolling bearing includes an inner ring, an outer ring, a plurality of rolling elements housed between the inner ring and the outer ring, and a sealing device. The sealing device includes a first shield connected to the inner ring, a second shield connected to the outer ring to rotate therewith, a first sealing element connected to the second shield and provided with a sealing lip contacting the first shield, and a second sealing element connected to the first shield and facing a radially outer section of the first sealing element, defining a channel therebetween inclined at an acute angle to a common axis of symmetry of the shields and delimited between a conical smooth lateral surface of the first sealing element and a lateral surface of the second sealing element arranged opposite and parallel to the first lateral surface and provided with a plurality of steps.

13 Claims, 3 Drawing Sheets

(56) References Cited

FOREIGN PATENT DOCUMENTS

| | | | | |
|---|---|---|---|---|
| JP | 2011208683 A | | 10/2011 | |
| JP | 2020020398 A | * | 2/2020 | ............. F16C 19/18 |
| WO | WO-2008018765 A1 | * | 2/2008 | ............ F16C 33/782 |
| WO | WO-2015064400 A1 | * | 5/2015 | ............ F16C 33/782 |
| WO | WO-2018074543 A1 | * | 4/2018 | |

* cited by examiner

LOW FRICTION SEALING DEVICE AND ASSOCIATED ROLLING BEARING

CROSS-REFERENCE

This application claims priority to Italian patent application no. 102022000017076 filed on Aug. 10, 2022, the entire contents of which are fully incorporated herein by reference.

BACKGROUND OF THE INVENTION

The present invention relates to a low-friction sealing device specifically designed for use in a rolling bearing with a high level of exposure to external contaminants such as water, dust and mud, the rolling bearing for example being part of a wheel bearing unit of a vehicle, in particular a truck, or a railway axle. The invention also relates to a rolling bearing fitted with such a low-friction sealing device.

A rolling bearing that forms a wheel bearing unit for trucks, or is used in a railway axle, comprises an inner ring, which remains stationary during use, and an outer ring, which rotates during use and is rigidly connected to a vehicle wheel (for example a truck wheel or train wheel), either directly with a fastening flange integral therewith, or indirectly with appropriate intermediate elements.

A radial annular space between the inner ring and outer ring contains rolling elements (usually balls or tapered rollers) designed to enable the inner ring and the outer ring to rotate freely relative to each other about a common axis of symmetry.

In vehicles such as trucks, to protect the rolling elements from contaminants such as water, dust and mud coming from outside the annular space, a sealing device is driven between the inner ring and the outer ring of the bearing at least on the inboard side, the sealing device generally comprising a first metal shield and a second metal shield facing one another and rigidly connected at an angle to the inner ring and to the outer ring respectively, one of the shields, usually the shield that is rotary when in use (i.e. the second shield rigidly connected to the outer ring in the case of trucks or railway axles) is integral with an annular sealing element comprising several elastically deformable sliding lips that are in interference contact with respective sliding surfaces of the first shield, which is rigidly connected to the inner ring, to generate a hydraulic seal. Such sealing devices are known as cassette seals.

However, external contaminants that may come in contact with the sliding sealing lips may cause premature wear and/or otherwise deteriorate the seal due to partial damage to the sliding lips and/or the sliding surfaces provided for the lips, which may be scratched by particularly hard dust grains.

In order to mitigate or eliminate this drawback, a pre-sealing action is implemented to prevent water, mud and dust from reaching the contact sealing lips of the sealing device that provide the sliding sealing action. This pre-sealing action is provided by an additional sliding lip on the shield that rotates when in use, and is designed to generate a centrifugal effect on external contaminants coming into contact therewith, in addition to a hydraulic sealing action.

This solution has drawbacks. Firstly, the additional contact lip increases the friction between the annular sealing element and the first shield, which increases energy consumption and is therefore undesirable, as well as generating more localized heat. Secondly, although the centrifugal effect created by the additional lip partially protects the lip, the additional lip is nonetheless exposed to damage by external contaminants and may therefore lose effectiveness.

SUMMARY OF THE INVENTION

The present invention is intended to provide a sealing device for a rolling bearing and a rolling bearing equipped with such a sealing device, without the drawbacks of the prior art, and in particular in which the hydraulic sealing action against external contaminants is substantially equivalent to the action provided by known sealing devices, but with relatively low friction, substantially equal to the friction generated in sealing devices without the additional pre-sealing lip.

The invention is also intended to provide a sealing device for a rolling bearing and an associated rolling bearing providing excellent, safe and long-term protection for the rolling elements against external contaminants, in which the overall footprint, particularly in the axial direction, of both the sealing device itself and the associated rolling bearing is small.

According to the invention, a sealing device for a rolling bearing and an associated rolling bearing equipped with such a sealing device are provided as defined in the attached claims.

BRIEF DESCRIPTION OF THE SEVERAL VIEWS OF THE DRAWINGS

Additional features and advantages of the present invention are set out in the following description of two non-limiting embodiments thereof, provided with reference to the figures in the attached drawings, in which.

DETAILED DESCRIPTION OF THE INVENTION

Figure 1:
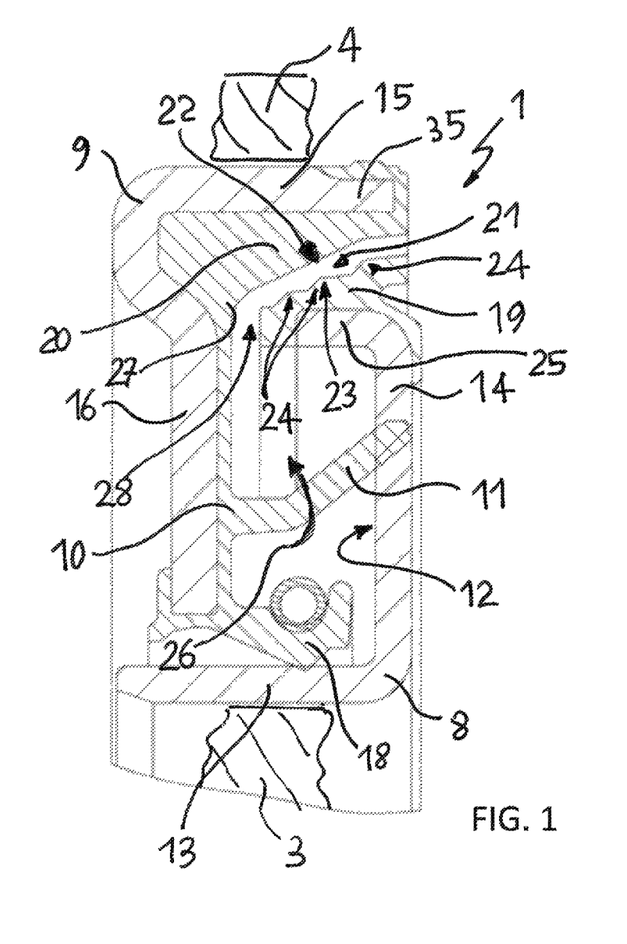
FIG. 1 is a partial schematic longitudinal radial cross-section view of a low-friction sealing device according to the invention.
Figure 5:
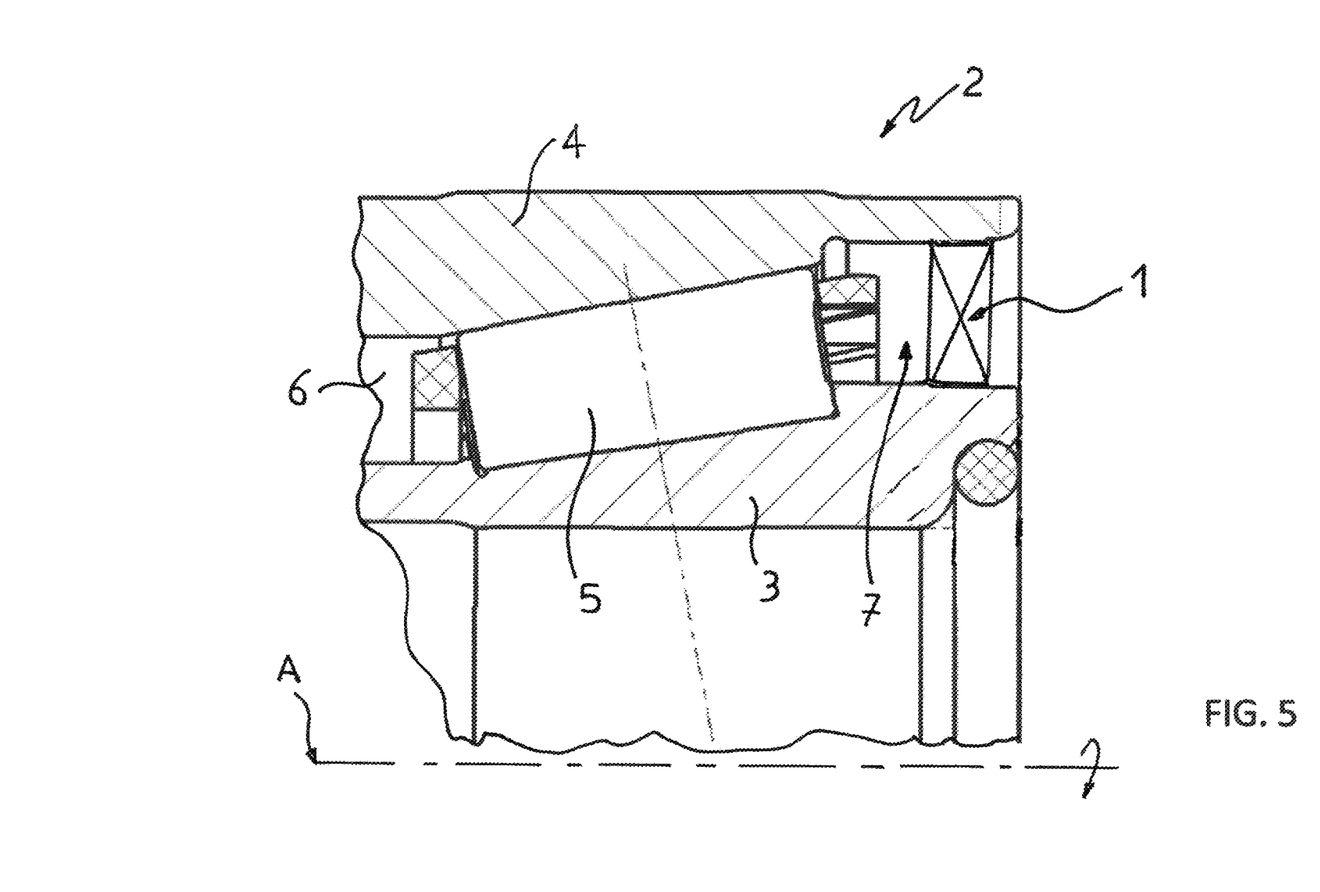
FIG. 5 is a partial schematic longitudinal radial cross-section view of a rolling bearing according to the invention fitted with a sealing device such as the one in FIG. 1 or FIG. 3, the sealing device being shown in FIG. 5 schematically as a block, for simplicity.

A cassette sealing device for a rolling bearing 2, which is otherwise known, is indicated as a whole with reference sign 1 in FIGS. 1 and 5, and illustrated only partially in FIG. 5 in radial section, the missing parts being symmetrical to the parts shown.

The rolling bearing 2, shown schematically in FIG. 5, comprises an inner ring 3 (which is stationary during use in the preferred embodiment of the invention described below), an outer ring 4 (which rotates during use in the preferred embodiment of the invention described below), and a plurality of rolling elements 5 (a double row of tapered rollers, of which only one is shown in the non-limiting example shown), seated in a known manner in a radial annular space 6 between the inner ring 3 and the outer ring 4 to enable the free relative rotation therebetween about a common axis of symmetry A.

At least one open axial end 7 of the annular space 6 is closed by the sealing device 1 according to the invention.

The rolling bearing 2 shown is designed to be used in a vehicle wheel bearing unit, specifically in a truck wheel bearing unit (which is known and therefore not shown for simplicity), in which the rotating ring is the outer ring 4, or in a railway axle (which is known and therefore not shown for simplicity), in which the rotating ring is always the inner ring 3 to which the rotary shaft of the axle carrying the wheels is fitted.

Naturally, the rolling bearing 2 can also be used in a motor vehicle wheel bearing unit, in which the rotating ring is the inner ring 3. Similarly, the rolling bearing 2 illustrated may itself comprise a wheel bearing unit (rather than being a component part thereof) if the inner ring 3 and the outer ring 4 are provided with appropriate fastening flanges (which are known and therefore not illustrated, for simplicity) for a vehicle wheel and for the suspension pillar (or other load-bearing part) of a vehicle.

In the present case, the axial end 7 is the end on the inboard side of the vehicle when in use, which is the side most exposed to the action of any external contaminants, such as water, dust and mud.

The rolling bearing 2 according to the invention is characterized in that it is fitted, at least at the axial end 7, with a sealing device 1, as described below and shown in FIG. 5 as a block for simplicity.

The sealing device 1 comprises a first annular shield 8 that is rigidly connected at an angle to the inner ring 3 when in use, a second annular shield 9 that is rigidly connected at an angle to the outer ring 4 when in use and that rotates with the outer ring in the illustrated non-limiting example, as shown schematically by the arrow in FIG. 5, and a first elastomeric sealing element 10 that in the illustrated example is rigidly connected to the second shield 9 and provided with at least one elastically deformable annular sealing lip 11 that is in contact with a corresponding sliding surface 12 of the first shield 8.

The shields 8 and 9 are coaxial with each other and with the rings 3 and 4 about the common axis of symmetry A and are usually made by stamping a sheared steel sheet, but could also be made from another metal or a synthetic plastic material with sufficient strength and stiffness.

According to a known layout, the shield 8 comprises a sleeve portion 13 fitted (usually by interference fitting) to the ring 3 and a flange portion 14 that projects radially cantilevered outward from the axis A, from an end of the sleeve portion 13 opposite the shield 9.

Similarly, the shield 9 comprises a sleeve portion 15 fitted (usually by interference fitting) to the ring 4 and a flange portion 16 that projects radially cantilevered inwards from the axis A, from an end of the sleeve portion 15 opposite the shield 8.

The first shield 8 is coupled opposite the second shield 9 and is seated radially inside the shield 9, so that the flange portions 14, 16 face one another, as do the sleeve portions 13 and 15, which are coaxial with each other and the axis A.

In the non-limiting preferred example illustrated, the annular elastomeric sealing element 10 includes a spring-loaded second elastically deformable annular sealing lip 18, which is already known, in addition to the lip 11. The sliding surface 12 extends over both the sleeve portion 13 and the flange portion 14, on the sides thereof that face the shield 9, so that, when in use, the annular lips 11 and 18 exert a dynamic axial and radial sealing action respectively on the shield 8 in interference contact with the lips so as to be elastically deformed and thus provide suitable contact pressure to provide the necessary hydraulic sealing, in the case of the lip 18 assisted by the compression action of the spring.

The shields 8 and 9 can therefore also be pre-assembled together, for example for transportation from the production workshop, before being mounted on the rings 3 and 4, the sealing device 1, thereby constituting a self-supporting unit.

According to the main aspect of the invention, to obtain a pre-seal between the shields 8, 9 protecting the lips 11, 18, instead of providing an additional sliding lip, for example a radial lip inside the sleeve portion 15 as in the prior art, the shield 8 that is normally stationary when in use also comprises a second annular elastomeric annular sealing element 19, which is integral with the shield 8 and which is arranged opposite a radially outer section or portion 20 of the elastomeric sealing element 10. The section 20 of the sealing element 10 is carried radially on the inside by the sleeve portion 15, and is integral therewith.

The elastomeric sealing elements 10 and 19 are normally over-moulded directly on the shields 8 and 9 and rigidly connected thereto using a known bonding process during vulcanization.

The elastomeric sealing element 10 can be made in one piece, as in the example shown, in which the section 20 is continuously connected to the lips 11 and 18, which are connected to each other, or the elastomeric sealing element can be moulded in separate sections, albeit during a single moulding operation, in which the radially outer section 20 may be continuously connected to the lips 11 and 18, or otherwise. In each case, the entire sealing element 10, with the section 20 and the lips 11 and 18 is rigidly connected to the shield 9 on one of the sides thereof facing the shield 8, preferably occupying all of that side of the shield 9. According to one aspect of the invention, the elastomeric sealing element 19 and the radially outer section 20 of the elastomeric sealing element 10 together form an annular channel 21, which is better illustrated in an enlarged scale in FIG. 2.

Figure 2:
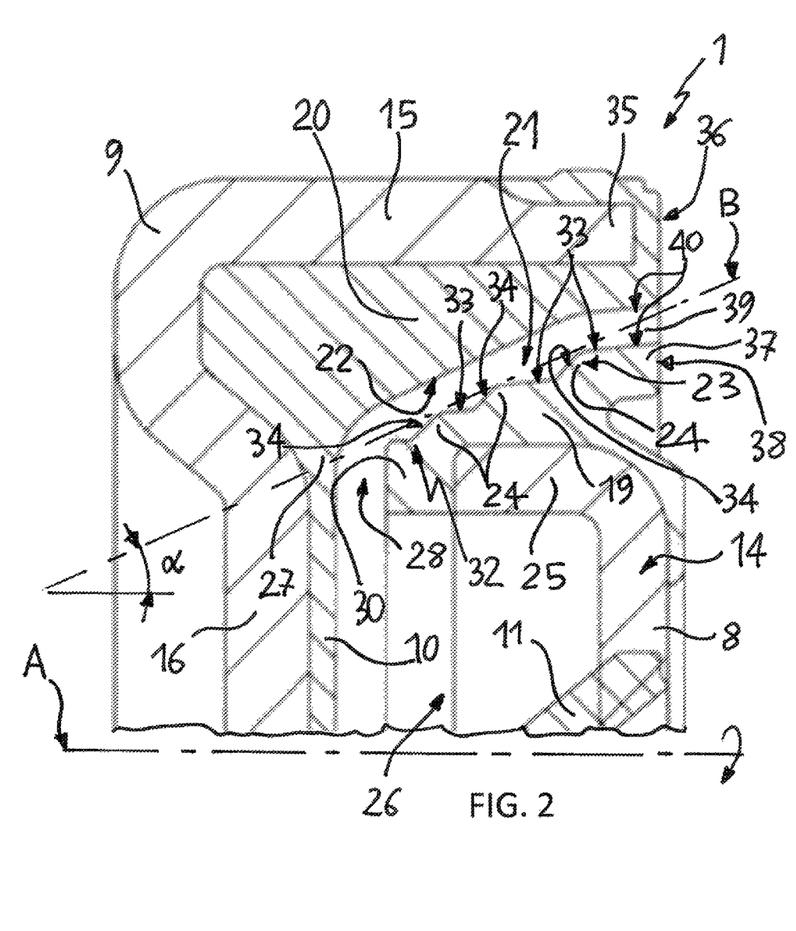
FIG. 2 is a magnified schematic radial cross-section view of a detail in FIG. 1.

According to one aspect of the invention, as shown in the radial cross section in FIGS. 1 and 2, the channel 21 is at least partly inclined in relation to the common axis of symmetry A, and has a direction of inclination in relation to that axis A defined by an axis B (FIG. 2), which forms a first acute angle α with the axis of symmetry A on the side of the second shield 9.

In combination with this layout, the annular channel 21 is delimited by a first lateral surface 22 of the radially outer section 20 of the first elastomeric sealing element 10 and a second lateral surface 23 of the second elastomeric sealing element 19 that is opposite and substantially parallel to the surface 22.

According to one aspect of the invention, the lateral surface 22 comprises a flat conical surface with no reliefs opposite the lateral surface 23.

The lateral surface 23, in combination, is provided with a plurality of annular steps 24 (FIG. 2) on the side of the first conical lateral surface 22 that are designed to cause a plurality of localized variations in the passage section in the annular channel 21 that are liable to cause turbulence in the annular channel 21 as a result of the rotation of the shield 9 about the common axis of symmetry A, or in any case a relative rotation between the shields 8 and 9.

The steps 24 are also designed to direct any external contaminants that have entered the annular channel 21 against the first lateral surface 22, in the preferred example embodiment shown when in rotation, to be guided by centrifugal force and/or gravity out of the annular channel 21.

More generally, the sealing device 1 according to the invention therefore comprises a first annular shield 8 designed to be rigidly connected at an angle to a radially inner ring 3 of the bearing 2 when in use, a second annular shield 9 designed to be rigidly connected at an angle to a radially outer ring 4 of the bearing 2 when in use, opposite the first shield 8, and a first elastomeric sealing element 10 that is integral with the second shield 9 and provided with at least one elastically deformable annular sealing lip 11 in interference contact with a sliding surface 12 of the first shield 8 arranged opposite the second shield 9, the first shield 8 being seated radially inside the second shield 9 with reference to a common axis of symmetry A of the annular shields 8, 9 and, when in use, of the inner ring 3 and the outer ring 4 of the rolling bearing 2.

The sealing device 1 further comprises a second elastomeric sealing element 19 that is integral with the first shield 8, at a radially outer end 25 of the first shield 8, in this case projecting axially cantilevered from the flange portion 14 on the side opposite the sleeve portion 13, being folded into an L-shape towards the second shield 9, so as to face and be parallel to the sleeve portion 13 on a radially inboard side thereof, and to the sleeve portion 15 on a radially outboard side thereof.

The second elastomeric sealing element 19 is also arranged opposite the radially outer section 20 of the first elastomeric sealing element 10 and defines the annular channel 21 therewith, the annular channel being at least partly inclined in the direction of inclination B forming an acute (less than 90°) angle α with the axis A on the side of the second shield 9.

As shown, the annular channel 21 is delimited by respective opposing lateral facing surfaces 23 and 22 of the second elastomeric sealing element 19 and of the radially outer section 20 of the first elastomeric sealing element 10.

According to the invention, a first of the lateral facing surfaces 22, 23 is defined by a conical surface with no reliefs, while the other is provided with a plurality of annular steps 24 facing the first surface. The first lateral surface is carried by whichever of the second elastomeric sealing element 19 and the radially outer section 20 of the first elastomeric sealing element 10 that rotates when in use, while the second lateral surface is carried by whichever of the second elastomeric sealing element 19 and the radially outer section 20 of the first elastomeric sealing element 10 that is stationary when in use.

In the preferred embodiment illustrated, the flat conical surface 22 delimits the radially outer section 20 of the sealing element 10 towards the shield 8, and therefore rotates when in use, while the surface 23 provided with the steps 24 delimits the additional sealing element 19 on the side of the shield 9, and is therefore stationary when in use.

The steps 24 projecting towards the surface 22 therefore cause a plurality of localized reductions in the passage section of the channel 21 (one for each step 24). According to one aspect of the invention, the annular steps 24 are also designed to simultaneously keep the direction of inclination B of the channel 21 as a whole substantially constant, since the surfaces 22 and 23 are substantially parallel and therefore encourage a hydrodynamic effect that pushes external contaminants out of the channel 21, as indicated above.

However, in the case of a rotating ring 3 and a stationary ring 4, the position of surfaces 22 and 23 can be reversed, arranging the tapered smooth surface 22 on the sealing element 19 instead of the surface 23, and conversely arranging the surface 23 with the steps 24 on the radially outer section 20 of the sealing element 10 instead of the surface 22. Hypothetically and if necessary, the sealing lips 11 and 18 can also be moved to the shield 8 and the sliding surface 12 can be moved to the shield 9.

In each case, in a radial direction towards the axis of symmetry A, the at least one annular sealing lip 11 (and both lips 11 and 18 in the example illustrated) and the sliding surface 12 are always arranged downstream of the annular channel 21, internally between the shields 8 and 9 and downstream of an annular chamber 26 in all cases delimited between the shields 8 and 9 and only accessible from the outside via the annular channel 21.

The radially outer L-shaped end 25 of the shield 8 radially delimits the outside of the annular chamber 26 and the elastomeric sealing element 19 is arranged across the radially outer L-shaped end 25 of the shield 8 and projects axially cantilevered therefrom with a cantilevered projecting portion 30 of the sealing element 19 at least towards the shield 9.

The elastomeric element 19 thus forms an annular axial gap 28 between the shields 8 and 9 with a radially inner portion 27 of the radially outer section 20 of the sealing element 10 (FIG. 2).

The axial gap 28 has a non-negligible radial dimension equal to the entire radial thickness of the axially projecting portion of the sealing element 19 and defines a collector channel for the annular channel 21, a collector channel connected to the channel 21 and the annular chamber 26, as shown in FIGS. 1 and 2.

The collector channel or gap 28 is arranged transverse to the direction of inclination B, and is preferably oriented substantially perpendicular to the axis of symmetry A.

Figure 3:
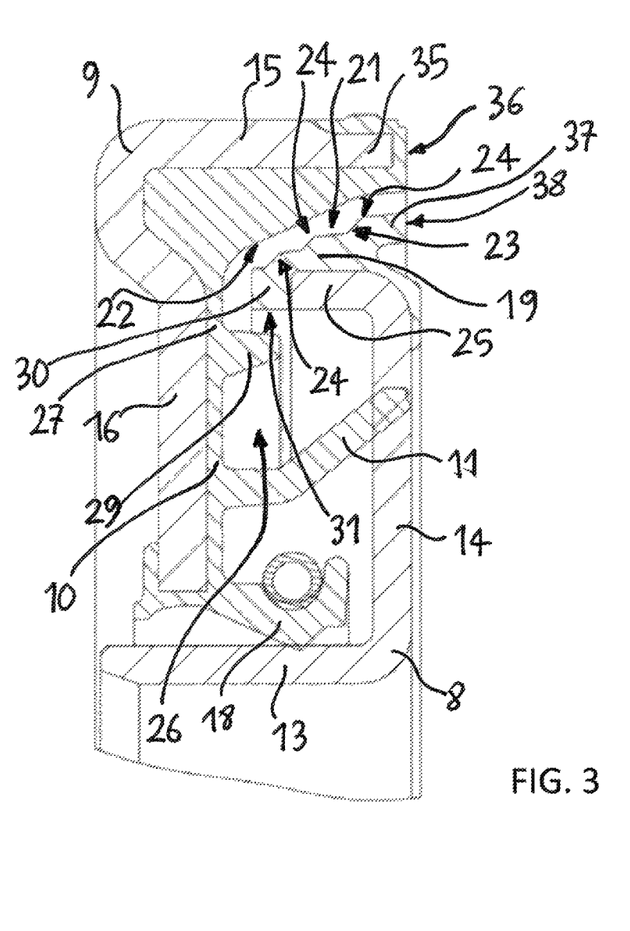
FIG. 3 is a partial schematic longitudinal radial cross-section view of a low-friction sealing device according to a possible variant of the invention.
Figure 4:
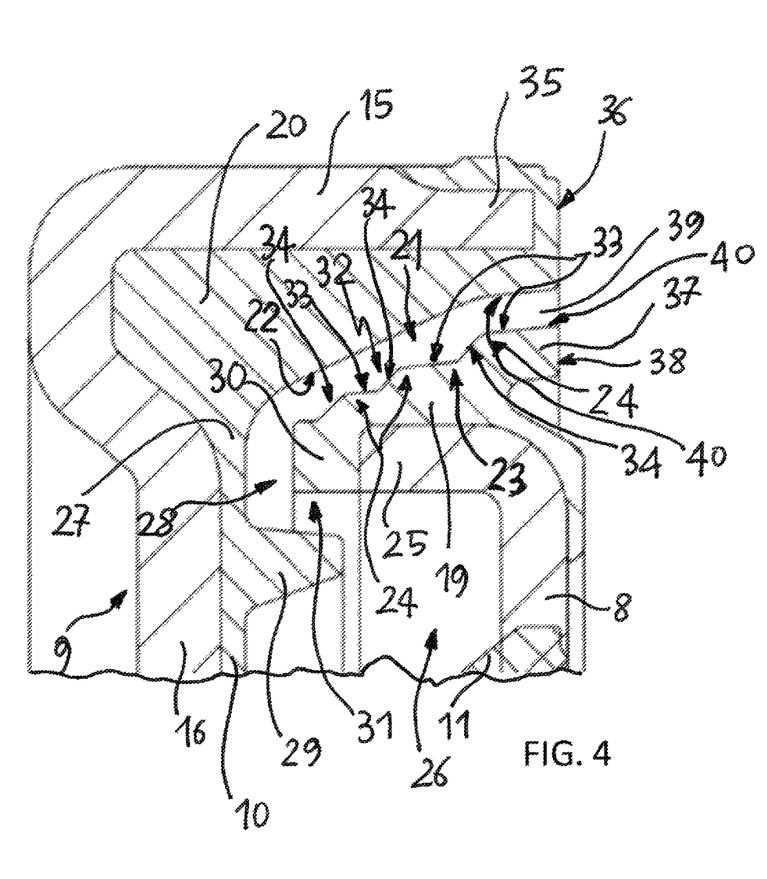
FIG. 4 is a magnified schematic radial cross-section view of a detail in FIG. 3.

FIGS. 3 and 4 show a possible variant 1b of the sealing device according to the invention. Details similar to or the same as those described above are given the same reference numbers for simplicity.

The variant 1b only differs from the sealing device 1 in that it includes an additional element, which is useful if the rolling bearing 1 is used at low rotational speeds, such as in wheel hubs of construction vehicles.

With reference to FIGS. 3 and 4, the radially inner portion 27 of the radially outer section 20 of the sealing element 10 includes an annular overhang 29 that projects towards the shield 8 in a substantially axial direction, and that, in a radial direction towards the axis of symmetry A, is arranged downstream of the axial gap 28 defining the collector channel for the annular channel 21, and upstream of the sealing lip 11.

In particular, the annular overhang 29 is arranged opposite and radially spaced apart from the collector channel or gap 28 for the annular channel 21 and forms a radial gap 31 between the shields 8 and 9 with the cantilevered projecting portion 30 of the sealing element 19, the gap preferably being designed to form a labyrinth seal immediately downstream of the annular channel 21.

In any case, the annular overhang 29 makes it difficult for any external contaminants to enter the annular chamber 26, while easily enabling any contaminants that have entered the chamber 26 to be discharged, either by gravity (the axis A usually being horizontal) or by a suction effect in the channel or gap 28 caused by the hydrodynamic effect in the channel 21 caused by the relative rotation of the surfaces 22 and 23.

In both embodiments 1 and 1b of the sealing device according to the invention, the lateral surface 23 is provided, on the side of the lateral surface 22, with at least two and preferably three or more annular steps 24, which sequentially define a staircase on the additional sealing element 19, in radial section, the staircase extending along an axis B, the axis gradually converging with the axis of symmetry A.

Each step 24 (FIGS. 2 and 4) comprises a first face 33 oriented away from and substantially parallel to the axis of symmetry A, and a second face 34 arranged transversely to the face 33 and connecting pairs of adjacent steps 24, except for the second face 34 of the radially innermost step 24 of the staircase 32 that connects the step with the cantilevered projecting portion 30 of the sealing member 19 facing the shield 9 and delimiting, together with the radially inner portion 27 of the radially outer section 20 of the sealing member 10, the collector channel or gap 28 for the annular channel 21 towards the annular chamber 26.

The second faces 34 of the steps 24 are all inclined in relation to the axis of symmetry A by substantially the same second acute angle, which is oriented in the same direction as the angle α but is larger than the angle, so as to define localized enlargements of the passage section in the annular channel 21.

According to one aspect of the invention, the respective edges of the steps 24 defined by the junction between each first and second face 33, 34 of each step 24 are all substantially aligned tangentially with the axis B of the staircase 32, which forms an angle exactly equal to the first acute angle α with the axis of symmetry A.

According to a further aspect of the invention, the radially outer section 20 of the sealing element 10 projects axially cantilevered from a radially outer end of the shield 9 folded into an L-shaped radial section on the side of the shield 8 and defined by the sleeve portion 15, about an entire axial edge 35 of the end or portion 15 of the shield 9, so as to delimit a first front face 36 of the shield 9 oriented towards the shield 8 and arranged substantially perpendicular to the axis of symmetry A.

Additionally, the second sealing element 19 comprises a radially outer, non-contacting annular lip 37 projecting axially cantilevered from the sealing element 19 away from the shield 9, and terminating with a free end delimited by a second, flat front face 38 arranged substantially perpendicular to the axis of symmetry A and, according to one aspect of the invention, flush with the first front face 36.

This specific arrangement allows the relative rotation of the shields 8 and 9 to prevent contaminants from entering the channel 21.

According to a final aspect of the invention, the radially outer annular lip 37 of the sealing element 19 and the radially outer section 20 of the elastomeric sealing element 10 delimit, upstream of the annular channel 21 in a radial direction towards the axis of symmetry A, an access channel 39 (FIG. 2) for the annular channel 21 delimited by opposing smooth side walls 40 arranged parallel to each other and inclined in relation to the axis of symmetry A, forming therewith a third acute angle that is oriented in the same direction as the angle α but that is smaller than the angle.

Based on the foregoing, it is clear that the specific sealing labyrinth defined by the channel 21 with the surfaces 22 and 23 and the associated steps 24 help to reduce friction without affecting sealing performance, optimizing the efficiency of the labyrinth and reducing the quantity of contaminants reaching the first sealing lip 11.

The shape of the rubberized shield 8 in combination with the internal shape of the rubberized seal 10 of the shield 9 pushes the contaminants out of the sealing area of the chamber 26 when the outer ring 4 is rotating and reduces the possibility of contamination reaching the sealing area defined by the lips 11 and 18.

All of the objectives of the invention are thus achieved.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A sealing device for a rolling bearing, the rolling bearing having a radially inner ring and a radially outer ring, the sealing device comprising:
    a first annular shield configured to be attached angularly integral to the radially inner ring of the bearing;
    a second annular shield configured to be attached angularly integral to the radially outer ring of the bearing in a position facing the first shield, the first shield being housed radially within the second shield with reference to a common axis of symmetry of the first and second annular shields and of the inner and outer rings of the rolling bearing;
    a first elastomeric sealing element formed integral in one piece with the second shield and having at least one elastically deformable annular sealing lip sealingly engageable with a sliding surface of the first shield disposed opposite to the second shield; and
    a second elastomeric sealing element formed integral in one piece with the first shield at a radially outer end of the first shield and in a position facing a radially outer section of the first elastomeric sealing element, the second elastomeric sealing element and the radially outer section of the first elastomeric sealing element defining between them an annular channel at least partially inclined, having a direction of inclination forming a first acute angle with the axis of symmetry and on the side of the second shield, the annular channel being bounded between respective opposite facing lateral surfaces of the second elastomeric sealing element and of the radially outer section of the first elastomeric sealing element, a first of the lateral facing surfaces being defined by a conical surface having no relief and a second of the lateral facing surfaces being provided toward the first lateral surface with a plurality of annular steps configured to result in a plurality of localized reductions of a cross-sectional passage of the channel, while maintaining the direction of inclination substantially constant.

2. The sealing device according to claim 1, wherein:
the second lateral surface is carried by a stationary one of the second elastomeric sealing element and the radially outer section of the first elastomeric sealing element; and
the first lateral surface is carried by the other, rotary one of the second elastomeric sealing element and the radially outer section of the first elastomeric sealing element.

3. The sealing device according to claim 1, wherein, proceeding in a radial direction toward the axis of symmetry, the at least one annular sealing lip of the first elastomeric element and the sliding surface of the first shield are arranged downstream of the annular channel, inside between the first and second shields and downstream of an annular chamber, the annular chamber being bounded between the first and second shields and accessible from the outside only through the annular channel.

4. The sealing device according to claim 3, wherein, in radial section, the radially outer end of the first shield is folded L-shaped toward the second shield and radially bounding on the outside the annular chamber, the second elastomeric sealing element being arranged astride the radially outer L-shaped end of the first shield and projecting axially cantilevered therefrom at least toward the second shield, an annular axial gap between the first and second shields being formed by the second elastomeric sealing portion and a radially inner portion of the radially outer section of the first elastomeric sealing element, the axial gap forming a collector channel for the annular channel connected to the annular chamber, the collector channel being arranged transverse to the direction of inclination of the annular channel.

5. The sealing device according to claim 4, wherein the collector channel extends substantially perpendicular to the axis of symmetry.

6. The sealing device according to claim 4, wherein the radially inner portion of the radially outer section of the first elastomeric sealing element includes an annular overhang projecting toward the first shield in a substantially axial direction and which, proceeding in a radial direction toward the axis of symmetry, is disposed downstream of the axial gap defining the collector channel for the annular channel and disposed upstream of the at least one sealing lip, the annular overhang being arranged facing and radially spaced from the collector channel for the annular channel, a radial gap between the first and second shields being formed between the annular overhang and a cantilevered portion of the second elastomeric sealing element.

7. The sealing device according to claim 6, wherein the radial gap is configured to define a labyrinth seal immediately downstream of the annular channel.

8. The sealing device according to claim 1, wherein the second lateral surface is provided with at least two of the annular steps facing towards the first lateral surface and sequentially defining a staircase on the second elastomeric sealing element in radial section, the staircase having an axis of development progressively approaching the axis of symmetry, each step including a first face facing opposite the axis of symmetry and arranged substantially parallel thereto and a second face arranged transversely to the first face and connecting adjacent pairs of the annular steps except for the second face of a radially innermost step of the staircase, the innermost step being connected with a cantilevered portion of the second elastomeric sealing element, the cantilevered portion facing the second shield, a collector channel being bounded by the cantilevered portion and by a radially inner portion of the radially outer section of the first elastomeric sealing element, the collector channel extending between the annular channel and an annular chamber bounded between the first and second shields, the at least one annular sealing lip of the first elastomeric sealing element and the sliding surface of the first shield being housed between the first and second shields and located downstream of the annular chamber.

9. The sealing device according to claim 8, wherein the at least two annular steps includes three or more annular steps.

10. The sealing device according to claim 8, wherein the second face of each one of the at least two annular steps is arranged inclined with respect to the axis of symmetry by a second acute angle, each second acute angle having a same value substantially the same as each other second acute angle and greater than a value of the first acute angle so as to define localized enlargements in the annular channel, each step having an edge defined by the junction between the first and second faces of the step, the edges of the at least two annular steps being substantially aligned tangent to the axis of development of the staircase, the axis of development forming with the axis of symmetry an angle equal to the first acute angle.

11. The sealing device according to claim 1, wherein:
the radially outer section of the first elastomeric sealing element extends axially cantilevered from a radially outer end of the second shield, folded in a radial L-shaped section on a side of the first shield, and all around an axial edge of the radially outer end of the second shield, so as to bound a first front face of the second shield facing on the side of the first shield and arranged substantially perpendicular to the axis of symmetry; and
the second elastomeric sealing element includes a radially outer non-contacting annular lip extending axially cantilevered from the second sealing element on a side opposite the second shield and terminating with a free end bounded by a second flat front face disposed substantially perpendicular to the axis of symmetry and flush with the first front face.

12. The sealing device according to claim 11, wherein the radially outer annular lip of the second elastomeric sealing element and the radially outer section of the first elastomeric sealing element delimit an access channel for the annular channel, the access channel being upstream of the annular channel proceeding in a radial direction toward the axis of symmetry, the access channel being bounded by opposing smooth lateral surfaces, the lateral surfaces being arranged parallel to each other and inclined with respect to the axis of symmetry by a third acute angle having a value less than a value of the first acute angle.

13. A rolling bearing for a hub bearing unit or a railroad axle, the rolling bearing comprising:
a stationary inner ring;
a rotatable outer ring;
a plurality of rolling elements housed in a radial annular space bounded between the inner ring and the outer ring to make the inner ring and the outer ring freely rotatable with respect to each other about a common axis of symmetry; and
a sealing device configured to close at least one open axial end of the annular space and including a first annular shield angularly integral with the inner ring, a second annular shield angularly integral with the outer ring and rotating in use therewith, the first shield facing the second shield and being radially housed inside the second shield, a first elastomeric sealing element integral with the second shield and provided with at least one annular sealing lip sealingly engageable with a sliding surface of the first shield, and a second elastomeric sealing element integral with the first shield and arranged in a position facing a radially outer section of the first elastomeric sealing element, the radially outer section being continuously connected, or not, to the at least one annular sealing lip;

wherein the second elastomeric sealing element and the radially outer section of the first elastomeric sealing element define between them an annular channel at least partially inclined with respect to the common axis of symmetry, having a direction of inclination forming a first acute angle with the axis of symmetry on the side of the second shield, the annular channel being bounded between a first lateral surface of the radially outer section of the first elastomeric sealing element defined by a conical surface with no relief and a second lateral surface, opposite to the first lateral surface, of the second elastomeric sealing element, facing and substantially parallel to the first lateral surface, and provided toward the first lateral surface with a plurality of annular steps configured to result in a plurality of localized variations of passage sections within the annular channel configured to produce turbulence in the annular channel as a result of rotation of the second shield about the common axis of symmetry, the steps being configured to direct any external contaminants that have penetrated into the annular channel against the first lateral surface such that the rotating first lateral surface guides the external contaminants out of the annular channel by centrifugal force and/or gravity.

\* \* \* \* \*